United States Patent
Holm-Christensen et al.

(10) Patent No.: US 10,940,448 B2
(45) Date of Patent: Mar. 9, 2021

(54) MULTIPLE-BED CATALYTIC REACTOR COMPRISING A MIXING DEVICE

(71) Applicant: Haldor Topsøe A/S, Kgs. Lyngby (DK)

(72) Inventors: Olav Holm-Christensen, Frendensborg (DK); Karthik Gopal Manoharan, Chennai (IN); Klaus Risbjerg Jarlkov, Hårlev (DK); Jacob Brix, Smørum (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/340,909

(22) PCT Filed: Nov. 3, 2017

(86) PCT No.: PCT/EP2017/078133
§ 371 (c)(1),
(2) Date: Apr. 10, 2019

(87) PCT Pub. No.: WO2018/091284
PCT Pub. Date: May 24, 2018

(65) Prior Publication Data
US 2020/0038816 A1    Feb. 6, 2020

(30) Foreign Application Priority Data

Nov. 16, 2016  (IN) .............................. 201611039109
Jan. 4, 2017   (DK) ........................... PA 2017 00007

(51) Int. Cl.
*B01F 3/04*    (2006.01)
*B01F 5/00*    (2006.01)
(Continued)

(52) U.S. Cl.
CPC ........ *B01F 3/04503* (2013.01); *B01F 5/0057* (2013.01); *B01J 8/0492* (2013.01);
(Continued)

(58) Field of Classification Search
None
See application file for complete search history.

(56) References Cited

U.S. PATENT DOCUMENTS 3,480,407 A    11/1969  Wentworth et al.
5,554,346 A    9/1996   Perry et al.
(Continued)

FOREIGN PATENT DOCUMENTS

WO    WO 00/24505 A1     5/2000
WO    WO 2014/121816 A1  8/2014
WO    WO 2014/194938 A1  12/2014

*Primary Examiner* — Tam M Nguyen
(74) *Attorney, Agent, or Firm* — Blank Rome LLP

(57) ABSTRACT

The present invention relates to multi-bed catalytic reactor with a cylindrical shape comprising a mixing device mounted between two catalyst beds in the reactor, said mixing device has a circular outer rim which corresponds to the inner wall of the reactor, the mixing device comprises; collecting means disposed in a collecting section for collecting fluid from an up-stream catalytic bed, mixing means disposed in a mixing section for mixing the collected fluid comprising guide vanes and guide ramps, and discharging means disposed in a discharging section for discharging the mixed fluid to a down-stream catalytic bed; wherein the collecting section, the mixing section and the discharging section are disposed outside the center of the circular cross-section of the reactor, as well as associated methods for mixing and the use of such a mixing device in catalytic reactors.

22 Claims, 3 Drawing Sheets

(51) Int. Cl.
 *B01J 8/04* (2006.01)
 *C10G 45/32* (2006.01)
 *C10G 45/44* (2006.01)
 *C10G 47/00* (2006.01)
 *C10G 49/00* (2006.01)

(52) U.S. Cl.
 CPC ............ *C10G 45/32* (2013.01); *C10G 45/44* (2013.01); *C10G 47/00* (2013.01); *C10G 49/002* (2013.01); B01F 2215/0036 (2013.01); B01J 2208/00849 (2013.01); C10G 2300/202 (2013.01); C10G 2300/205 (2013.01); C10G 2300/207 (2013.01)

(56) References Cited

U.S. PATENT DOCUMENTS

| | | |
|---|---|---|
| 6,183,702 B1 | 2/2001 | Nguyen et al. |
| 6,508,459 B1 | 1/2003 | Jacobs et al. |
| 8,017,095 B2 | 9/2011 | Kemoun et al. |
| 2004/0151643 A1 | 8/2004 | McDougald et al. |
| 2013/0064740 A1 | 3/2013 | Boyak et al. |
| 2015/0328610 A1 | 11/2015 | Zahirovic et al. |

MULTIPLE-BED CATALYTIC REACTOR COMPRISING A MIXING DEVICE

FIELD OF THE INVENTION

This invention relates to a reactor comprising a mixing device, specifically a multi-bed hydroprocessing reactor. Specifically, the mixing device is for use in down-flow catalytic reactors which include vertically superimposed packed beds of particulate catalytic material wherein a liquid, liquid and gas mixture or vapour is processed as it flows down through the packed beds. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC).

BACKGROUND OF THE INVENTION

Hydrocracking is a process for converting of heavy oil fractions to light oil fractions. Hydroprocessing is taking place in a hydroprocessing catalytic reactor which is the key element of a hydroprocessing unit. Hydroprocessing catalytic reactors can have single or multiple catalyst beds. Which of the options will be chosen for a particular reactor depends on the amount of catalyst is required for conversion of the feed to the product with desired properties. Most of the hydroprocessing reactions are exothermic and heat is developed as feed is passing through the catalyst bed. In order not to expose the catalyst to higher temperatures than required, and consequently to accelerate deactivation of the catalyst, the required volume of catalyst is divided into a number of beds with cooling zones (quench sections) installed between the beds. The cooling is achieved by introduction of cold hydrogen gas through the "quench pipe". Besides the cooling, the quench zone must achieve spatial uniformity of species/temperatures of the liquid phase leaving the section to the lover bed. For this purpose, a mixing chamber is installed in the section.

After the cooling and mixing stage the fluid must be distributed evenly on the catalyst of the bed below. For this purpose, distribution trays are installed below the mixing chamber and above the catalyst of the lower bed. In order to achieve the highest distribution quality, it must be assured that the distributor trays operate within own sensitivity limits. Distributor trays can operate as required as long as liquid depth on the tray is no more than 10 mm different from end to end of the tray Therefore, flow parameters of the fluid exiting the mixing chamber are often changed by different means and brought to the values required for the best performance of the distributor tray.

As it can be seen from the descriptions above the current organisation of the quench section consists from: quench pipe, mixing chamber, splash plate, rough cut tray (optional) and distributor tray. In some approaches the catalyst support grid, holding the catalyst of the higher bed, as well as the catalyst grid support beams are considered as a part of the quench section.

These elements are occupying lot of reactor space by own volume as well as free inter-element volume required to provide access to each of the elements for purpose of installation, un-installation, maintenance and cleaning of the elements.

The height of the quench section is the distance from the catalyst of lower bed to the catalyst of the bed above. The volume occupied by quench section is "inactive" reactor volume and decreasing this volume is paramount if increase of the active reactor volume is to be achieved. The space saved by decrease of the quench section height can be used for loading of the additional catalyst (revamp) or reduction of total reactor height (new reactors).

Known art mixers propose a solution to the problem of effective mixing and space requirements for the mixer. U.S. Pat. No. 8,017,095 discloses means to provide mixing of gas and fluids in a height constrained interbed space of a catalytic reactor without increasing pressure drop. In particular, the device improves the effectiveness of an existing mixing volume in mixing the gas phase and liquid phase of two-phase systems. According to U.S. Pat. No. 8,017,095, the mixing device helps create a highly arcuate flow to incoming effluents and a high degree of mixing within a constrained interbed space of a catalytic reactor.

Due to the installation, un-installation and maintenance requirements as well as for cleaning of all elements of the quench section it is crucial to provide enough space for full access to any of the elements. In order to minimise complexity of the work in the reactor it is necessary to enable convenient and fast opening/closing of all man-ways of all of the elements of the section.

US2015328610 discloses a mixing device mounted between two catalyst beds in a multi-bed catalytic reactor with a cylindrical shape. The mixing device has a circular outer rim which corresponds to the inner wall of the reactor, and includes a collecting section for collecting fluid from an up-stream catalytic bed, a mixing section for mixing the collected fluid, and a discharging section for discharging the mixed fluid to a down-stream catalytic bed. The collecting section, the mixing section and the discharging section are disposed outside the centre of the circular cross-section of the reactor.

However, there is a need for an even more effective mixing device especially in situations where the fluid comprises both liquid and gas phases which challenges the mixing due to the influence of centrifugal and gravitational forces.

Therefore, a need exists to provide an improved efficient mixer which still occupies less reactor space, especially vertically, than known mixers and which mixes effectively with a limited pressure drop.

SUMMARY OF THE INVENTION

The present invention provides high efficiency mixing and redistribution while occupying minimal reactor volume and causing limited pressure loss and further full-fills all other earlier listed requirements related to the installation, maintenance and cleaning.

The new multi-bed reactor with a cylindrical shape according to claim 1 of the invention comprises a mixing device for mixing fluids, the mixing device is mounted between two catalyst beds in the multi-bed catalytic reactor. The mixing device has a circular outer rim which corresponds to the inner wall of the reactor. The outer rim of the mixing device can either be an integrated part of the reactor wall such that the reactor wall provides the outer wall of the mixer or it can be a wall independent of the reactor connected to the reactor or placed adjacent to the inner side of the reactor wall. The mixing device comprises; collecting means disposed in a collecting section for collecting fluid from an upstream catalytic bed, mixing means disposed in a mixing section for mixing the collected fluid and discharging means disposed in a discharging section for discharging the mixed fluid to a down-stream catalytic bed. Particularly, the collecting section, the mixing section and the discharging section are disposed outside the centre of the circular cross-section of the reactor. In this way the centre of the mixer is free space which can be used for service and maintenance of the reactor internals and the mixer itself, but even though, a large area and distance for effective mixing is ensured, since the largest area and circumferential distance of the cross section of the reactor is the area outside the centre of the cross sectional area (circle) of the reactor and thus the mixer. Hence, the mixing device has a donut shape and the collecting section, the mixing section and the discharging section are disposed in the outer part, the donut ring whereas the centre part is free space. Furthermore, the mixing means comprise not only an extended passage for mixing the fluids, but also guide vanes and guide ramps. The guide vanes as well as the guide ramps each have a first and a second end and are mounted at least within the mixing section for thorough and more efficient mixing of the fluids, especially mixing of liquid fluid with gaseous fluids. Without the guide ramps and guide vanes, the liquid and gaseous fluids may be difficult to mix homogeneous due to the centrifugal forces which tend to force the heaviest liquid fluids to the radial outer part of the circular arc shaped mixing section. The guide vanes and ramps forces the liquid fluid to travel inwards and upwards in the mixing section, against the centrifugal and gravity forces.

In an embodiment of the invention, the floor of the mixing section, i.e. the wall of the mixing section which is in the vertically lower part of the mixing section comprises guide vanes.

In a further embodiment of the invention, the radially outer wall of the mixing section comprises guide ramps.

Due to the centrifugal and gravitational forces, the lower and outer part of the circular arc shaped mixing section is where the relative heavy liquid fluids have a tendency to seek to. Hence, the guide vanes and guide ramps will have the largest mixing effect to the fluids in the mixing device when located on the floor and the outer wall of the mixing section.

In a further embodiment of the invention, the ceiling, i.e. the vertically upper wall of the mixing chamber comprises guide vanes.

In an embodiment of the invention, the guide vanes have an inwards progression when seen in the flow direction from the collecting section to the discharging section. Accordingly, when the fluid flows in a circular movement from the collecting section, through the mixing section and on to the discharging section, the guide vanes will guide a part of especially the relatively heavy, liquid part of the fluid in a spirally movement inwards towards the centre of the reactor and thereby counter the tendency for the liquid to move towards the outer perimeter of the circular mixer. Correspondingly, in an embodiment of the invention, the guide ramps have an upwards progression when seen in the flow direction from the collecting section to the discharging section, which guides especially the relatively heavy, liquid part of the fluid in a spirally movement upwards in the mixing device, countering the gravitational forces and inducing turbulence and enhanced mixing. The enhanced mixing is a trade-off which costs increased pressure drop in the mixing device. To avoid too much pressure-drop, said inwards and upwards progression relative to the length of the guide vanes is less than 1 to 2. This means, when a guide vane or ramp is for instance 2 meters long, its inwards or upwards progression will be less than 1 meter. In a further embodiment of the invention, the pressure loss is also considered as the height of the guide vanes is less than one third of the cross sectional height of the mixing section and the height of the guide ramps is less than one third of the cross sectional width of the mixing section.

In an embodiment of the invention, the weight and the material cost is considered and balanced to the structural strength of the mixing device, as the guide vanes and guide ramps are made from plate material and the thickness of the plate is between 0.25 mm and 4 mm. It is also considered to shape the vanes and ramps in a slight curve, which is stronger and more stiff relative to vanes and ramps with a straight line shape. To enhance the mixing function of the guide vanes, the first end of these, when seen in the flow direction of the fluid may be arranged adjacent or in contact to the outer wall of the mixing section, whereas the second end of the guide vanes may be arranged adjacent or in contact with the inner wall of the mixing section. Likewise, the first end of the guide ramps may be arranged adjacent to the floor of the mixing section whereas the second end of the guide vanes may be arranged adjacent to the ceiling of the mixing section. The number of guide vanes and guide ramps may be from 2 to 200, balancing production-, material costs and pressure loss with enhanced mixing. Considering the process parameters and fluid composition, generally a higher number of vanes provides more efficient mixing, but increases the pressure drop.

In an embodiment of the invention, the collecting section, the mixing section and the discharging section are disposed outside the centre one third of the circular cross-sectional area of the reactor, preferably outside the centre half of the circular cross-sectional area of the reactor. Accordingly, a large area and a large distance is disposed for the mixer relative to its height, but also a large free centre space is ensured for service and maintenance.

In an embodiment of the above described invention, the mixing device is constructed so the collecting means, the mixing means and the discharging means comprise channels comprising circular arc divider walls horizontally dividing one section from another section or dividing one section from the centre of the circular cross-section of the reactor. The mixer main body is donut shaped and is divided by the circular arc divider walls, which substantially forms a spiral (spiralling inwards) which divides the mixer to three connected sections: Collection, mixing and discharging section. The gas and liquid effluent from the catalyst bed above the mixer is collected at the top of the mixer and directed to the collection channel placed at the maximum reactor/mixer diameter. The collected liquid and gas are directed toward an opening which connect the collection and mixing chamber. After the gas and liquid enter the mixing channel they travel/rotate in the mixer in a circular arc movement before entering the discharge channel. The liquid and gas are discharged from the mixer through the opening designed for this purpose. Discharge direction for gas and liquid phase is toward the reactor centre. The uniform pressure profile above the distributor tray achieved by controlled flow pattern of the gas and liquid leaving the mixer contributes to the uniform liveliness of the liquid on the distributor tray what for consequence have uniform gas and liquid distribution to the catalyst in the bed below the tray.

In an embodiment of the invention, the collecting means of the mixing device has one inlet for collecting the fluid from the up-stream catalytic bed. And in a further embodiment the mixing device further comprises a quench inlet for adding a quench fluid to the collected fluid, said quench inlet is disposed in the collecting section. In an embodiment, the quench inlet may be a gas tube which is located about 180° from the opening of the collection channel. The quench gas tube may be inserted into the collection channel and for instance cold hydrogen gas can be introduced directly to the mixer. A quench ring is not required.

In a further embodiment of this first aspect of the invention, the collecting section is disposed in an outer generally circular cross sectional area of the reactor relative to the mixing section and the mixing section is disposed in an outer generally circular cross sectional area of the reactor relative to the discharging section. As above the active area of the mixer, collecting, mixing and discharge is placed in the outer part of the circular area where the circumferential distance is the greatest, ensuring a long flow path so efficient mixing and even discharge is possible even with a low pressure loss and at the same time leaving the centre part of the mixer free for inspection and service activities which all is a main object and advantage of the invention.

In a particular embodiment of the invention the collecting section, the mixing section and the discharging section each is disposed in at least a 120° sector of the generally circular cross sectional area of the reactor. The at least 120° ensures that each of the three processes are performed effectively in a long path. The three paths are not necessarily of equal length, particularly the mixing section may advantageously be disposed in more than a 120° sector to secure effective mixing with a small amount of pressure loss and the discharge section may advantageously be disposed in about 360° to ensure even discharge of the fluid in the entire circle of the mixer.

The fluid of the reactor and the mixer may comprise both gas phase, liquid phase and vapour phase. In an embodiment of the invention, even mixing is further improved by constructing the mixer so the discharging means comprise an inner circular arc divider wall providing a spilling brim for a liquid phase of the fluid. This has the effect that both the gas phase and the liquid phase are distributed evenly along the entire circle of the mixer and the entire cross sectional area of the reactor. In another embodiment of the invention there may instead be an outer spilling brim or as in a further embodiment of the invention both an inner and an outer spilling brim for even distribution of the liquid phase of the fluid.

To optimise the construction of the reactor and the one or more mixers within, the one or more mixing devices may form an integrated part of a catalyst bed support of the reactor. This has the advantage that the building-height of the entire construction may be reduced as compared to separate constructions of mixer and supports. Also the material cost of the construction may be reduced. Accordingly, in an embodiment of the invention the mixing device has a height of less than 1 m, preferably less than 0.5 m with respect to the axial direction of the reactor.

A further embodiment of the invention is a method of mixing a fluid flowing inside a catalytic reactor between an upper catalyst bed and a lower catalyst bed of the reactor. In a first step of the process the cross sectional area of the flow of fluid from the upper catalyst bed is constricted to a collecting section disposed in a cross sectional area of the reactor in the radially outer third of a 120°-360° sector of the generally circular cross sectional area of the reactor to collect the fluid. This is done by preventing the fluid to flow down in the centre of the cross sectional area, for instance by a plate placed in the centre of the cross sectional area.

The collected fluid is then guided by the mixing device to flow in a tangential direction in the outer part of the circular mixer, in the mixing section. In a further embodiment of the invention the fluid may be guided to flow in two tangential directions and the fluid may start to flow in one or two tangential directions from one inlet of the mixer or from a plurality of inlets of the mixer.

The fluid is flowing in a circular movement in the mixing section and while doing so the fluid is mixed to become a homogenous fluid with respect to content, vapour, temperature and velocity. Efficient mixing is achieved because the fluid is flowing in the outer part of the circular cross section of the mixer where the mixing distance, the circumference, is the longest. Furthermore, the mixing is enhanced by guide vanes or guide ramps or both guide vanes and guide ramps comprised in the mixing device as described in the above. There is no mixing in the centre part of the mixing device i.e. disposed outside the centre of the circular cross-section of the reactor, this is left open as free space.

After the fluid has been mixed, it flows further on to the discharge section of the mixing device, where it is discharged to the lower catalyst bed while at least a part of it is flowing in at least one tangential direction. Also the discharging section is disposed outside the centre of the circular cross-section of the reactor, whereby also the discharging can be performed homogenous as a plug flow since it is performed over a long circumferential distance.

While the discharge flow of the fluid moves tangentially in a circular movement it is also moving either radially inwards, radially outwards or both radially inwards and outwards while flowing from the discharge section towards the catalyst bed underneath. The discharge section may include at least one spilling brim which forms an edge over which a liquid phase may flow/spill, forming droplets which blend with the gas phase discharging from the mixing device and forming a plug flow. The spilling brim helps ensuring a homogenous discharge of the liquid phase from the mixing device.

In the above described method of mixing fluid flowing inside a catalytic reactor, the fluid may comprise a gas phase and a liquid phase and possibly a vapour phase.

In an embodiment of the method of mixing fluid flowing inside a catalytic reactor, the fluid moves in an axially downwards direction relative to the reactor when flowing from the collecting section to the discharging section. Hence, the fluid performs a spiral movement downwards when flowing from the collecting section, to the mixing section and further to the discharging section.

In another embodiment of a method of mixing fluid flowing inside a catalytic reactor, the fluid moves in a radially inwards direction relative to the reactor when flowing from the collecting section to the discharging section. Hence, the fluid performs a spiral movement circular inwards when flowing from the collecting section, to the mixing section and further to the discharging section.

In yet a further embodiment of the described method, the fluid may flow in a combination of the two described movements, i.e. in a spirally movement circular inwards and downwards when flowing from the collecting, to the mixing and further to the discharging section of the mixing device.

In a further embodiment of the invention the multi-bed catalytic reactor with a cylindrical shape and comprising a mixing device according to any of the embodiments as described above, is used for sulphur and nitrogen conversion (HDS/HDN), hydrogenation of olefins and aromatics, metals removal, oxygen conversion and hydrocracking.

Features of the Invention

1. A multi-bed catalytic reactor with a cylindrical shape comprising a mixing device mounted between two catalyst beds in said reactor, said mixing device has a circular outer rim adapted to fit within the inner wall of the reactor, the mixing device comprises;

collecting means disposed in a collecting section for collecting fluid from an upstream catalytic bed, mixing means disposed in a mixing section comprising a floor, a ceiling and inner and outer walls for mixing the collected fluid, and discharging means disposed in a discharging section for discharging the mixed fluid to a down-stream catalytic bed;

wherein the mixing device has a donut shape and the collecting section, the mixing section and the discharging section are disposed outside the centre of the circular cross-section of the reactor and wherein said mixing means comprise guide vanes with a first and a second end, guide ramps with a first and a second end or comprises said guide vanes and said guide ramps.

2. A multi-bed catalytic reactor with a cylindrical shape comprising a mixing device according to feature 1, wherein the floor of said mixing section comprises guide vanes.

3. A multi-bed catalytic reactor with a cylindrical shape comprising a mixing device according to any of the preceding features, wherein the outer wall of said mixing section comprises guide ramps.

4. A multi-bed catalytic reactor with a cylindrical shape comprising a mixing device according to any of the preceding features, wherein the ceiling of said mixing section comprises guide vanes.

5. A multi-bed catalytic reactor with a cylindrical shape comprising a mixing device according to any of the preceding features, wherein said guide vanes have an inwards progression when seen in the flow direction from the collecting section to the discharging section and the inwards progression relative to the length of the guide vanes is less than 1 to 2.

6. A multi-bed catalytic reactor with a cylindrical shape comprising a mixing device according to any of the preceding features, wherein said guide ramps have an upwards progression when seen in the flow direction from the collecting section to the discharging section and the upwards progression relative to the length of the guide vanes is less than 1 to 2.

7. A multi-bed catalytic reactor with a cylindrical shape comprising a mixing device according to any of the preceding features, wherein said guide vanes have a height which is less than one third of the cross sectional width of said mixing section.

8. A multi-bed catalytic reactor with a cylindrical shape comprising a mixing device according to any of the preceding features, wherein said guide ramps have a height which is less than one third of the cross sectional height of said mixing section.

9. A multi-bed catalytic reactor with a cylindrical shape comprising a mixing device according to any of the preceding features, wherein the guide vanes and guide ramps are made from plate with a thickness between 0.25 and 4 mm.

10. A multi-bed catalytic reactor with a cylindrical shape comprising a mixing device according to any of the preceding features, wherein the first end of each guide vane is arranged adjacent to the outer wall of said mixing section and the second end of each guide vane is arranged adjacent to the inner wall of said mixing section.

11. A multi-bed catalytic reactor with a cylindrical shape comprising a mixing device according to any of the preceding features, wherein the first end of each guide ramp is arranged adjacent to the floor of said mixing section and the second end of each guide ramp is arranged adjacent to the ceiling of said mixing section.

12. A multi-bed catalytic reactor with a cylindrical shape comprising a mixing device according to any of the preceding features, wherein the number of guide vanes is between 2 and 200.

13. A multi-bed catalytic reactor with a cylindrical shape comprising a mixing device according to any of the preceding features, wherein the number of guide ramps is between 2 and 200.

14. A multi-bed catalytic reactor with a cylindrical shape comprising a mixing device according to any of the preceding features, wherein the outer rim of said mixing device is an integrated part of the reactor wall.

15. A multi-bed catalytic reactor with a cylindrical shape comprising a mixing device according to feature 1, wherein the collecting section, the mixing section and the discharging section are disposed outside the centre one third of the circular cross-sectional area of the reactor, preferably outside the centre half of the circular cross-sectional area of the reactor.

16. A multi-bed catalytic reactor with a cylindrical shape comprising a mixing device according to any of the preceding features, wherein the collecting means, the mixing means and the discharging means comprise channels comprising circular arc divider walls horizontally dividing one section from another section or dividing one section from the centre of the circular cross-section of the reactor.

17. A multi-bed catalytic reactor with a cylindrical shape comprising a mixing device according to any of the preceding features, wherein the mixing device further comprises a quench inlet for adding a quench fluid to the collected fluid, said quench inlet is disposed in the collecting section.

18. A multi-bed catalytic reactor with a cylindrical shape comprising a mixing device according to any of the preceding features, wherein the collecting section is disposed in an upstream axial level of the reactor relative to the discharging section.

19. A multi-bed catalytic reactor with a cylindrical shape comprising a mixing device according to any of the features 1 to 17, wherein the collecting section is disposed in an outer generally circular cross sectional area of the reactor relative to the mixing section, and the mixing section is disposed in an outer generally circular cross sectional area of the reactor relative to the discharging section.

20. A multi-bed catalytic reactor with a cylindrical shape comprising a mixing device according to any of the preceding features, wherein the collecting section, the mixing section and the discharging section each is disposed in at least a 120° sector of the generally circular cross sectional area of the reactor.

21. A multi-bed catalytic reactor with a cylindrical shape comprising a mixing device according to any of the preceding features, wherein the discharging means comprise an inner circular arc divider walls providing a spilling brim for a liquid phase of the fluid.

22. A multi-bed catalytic reactor with a cylindrical shape comprising a mixing device according to any of the preceding features, wherein the mixing device forms an integrated part of a catalyst bed support of the reactor.

23. A multi-bed catalytic reactor with a cylindrical shape comprising a mixing device according to any of the preceding features, wherein the mixing device has a height of less than 1 m, preferably less than 0.5 m with respect to the axial direction of the reactor.

24. A method of mixing fluid comprising a gas phase and a liquid phase and possibly a vapour phase and flowing inside a multi-bed catalytic reactor with a cylindrical shape between an upper catalyst bed and a lower catalyst bed thereof, said method is performed in a donut shaped mixing device within the reactor which has a circular outer rim adapted to fit within the inner wall of said reactor, the method comprising the steps of, constricting the cross sectional area of the flow of fluid from the upper catalyst bed to a collecting section disposed in a cross sectional area of the reactor disposed in the radially outer third of a 120°-360° sector of the generally circular cross sectional area of the reactor to collect the fluid, flowing the collected fluid in at least one tangential direction, mixing the fluid while it is flowing in at least one tangential direction in a mixing section disposed outside the centre of the circular cross-section of the reactor by missing means, the mixing means comprise guide vanes, guide ramps or comprise guide vanes and guide ramps, and discharging the fluid to the lower catalyst bed while it is flowing in at least one tangential direction in a discharging section disposed outside the centre of the circular cross-section of the reactor.

25. Use of a multi-bed catalytic reactor with a cylindrical shape comprising a mixing device according to any of the features 1-23 for sulphur and nitrogen conversion (HDS/HDN); hydrogenation of olefins and aromatics, metals removal, oxygen conversion and hydrocracking.

BRIEF DESCRIPTION OF THE DRAWINGS

The invention is further illustrated by the accompanying drawings showing examples of embodiments of the invention.

| Position numbers | |
|---|---|
| 01. | Mixing device. |
| 02. | Circular outer rim. |
| 03. | Mixing section. |
| 04. | Discharging section. |
| 05. | Centre of circular cross-section of reactor. |
| 06. | Channels. |
| 07. | Circular arc divider walls. |
| 08. | Spilling brim. |
| 09. | Guide vanes. |
| 10. | Guide ramps. |

DESCRIPTION OF THE DRAWINGS

A number of embodiments of the invention will be explained in more detail in the following, with reference to the drawings.

Figure 1:
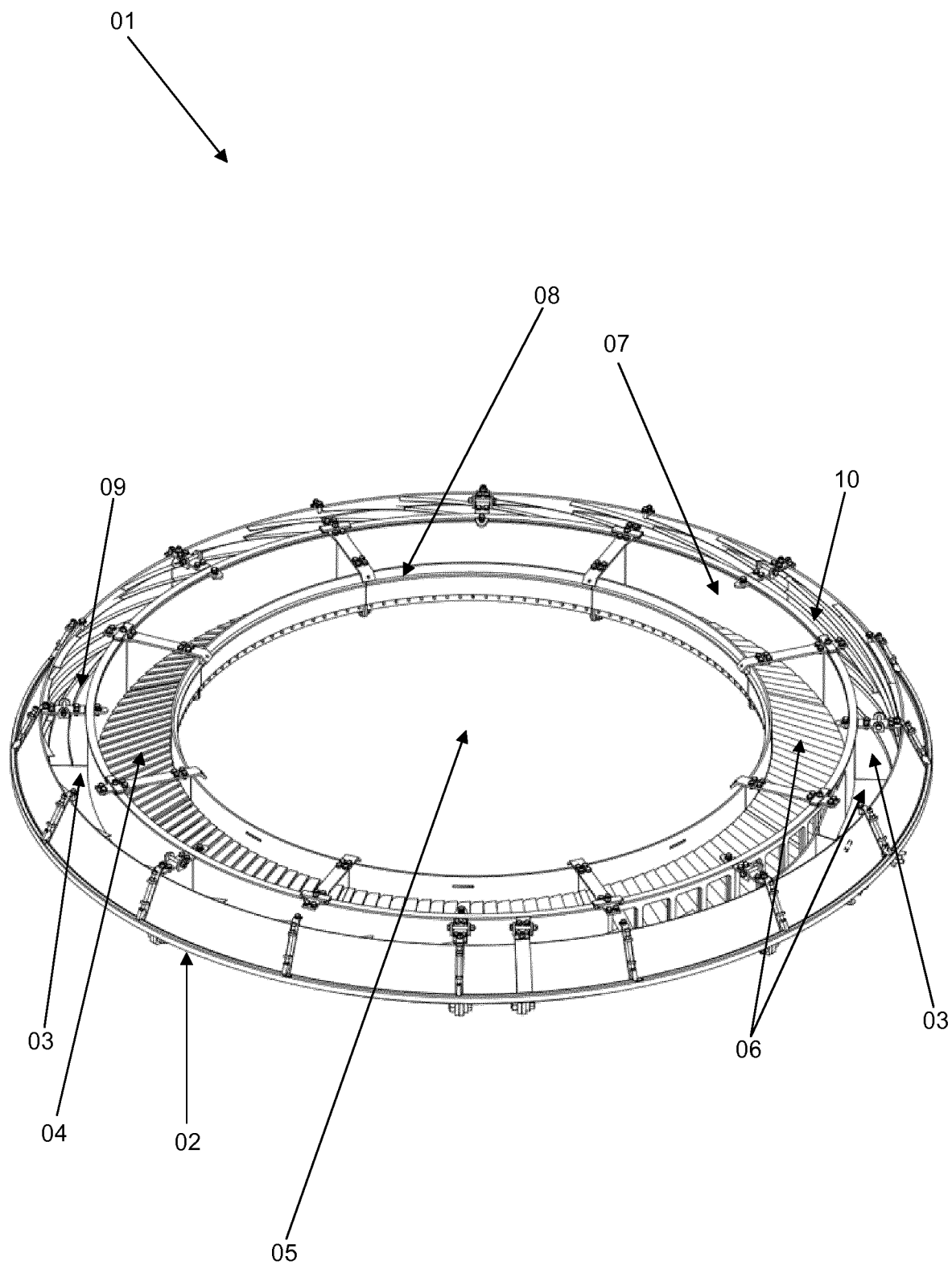
FIG. 1 shows an isometric top view of the mixing device in a multi-bed catalytic reactor (not shown) according to an embodiment of the invention.

The isometric view of presented in FIG. 1 shows a top/side view of the mixing device 01 comprised between catalytic beds in a multi-bed catalytic reactor (not shown). The mixing device has a circular shape to correspond the inner circular wall of the cylindrical reactor wherein the mixing device is to be installed. In particular, the outer rim 02 of the mixing device is circular. The outer rim matches the inner wall of the reactor. The reactor wall may form the outer wall of the mixing device or, as in the embodiment shown in FIG. 1, the mixing device features an outer wall itself. The minor gap between the outer rim and the reactor wall may be sealed, for instance by welding. The collection section is formed between the outer wall of the mixing device and a circular arc divider wall 07. Here the fluid flowing from the catalyst bed above (not shown) is collected. The fluid can only flow to the next underlying catalyst bed via the inlet and further to the collecting section as the rest of the cross sectional area is blocked, e.g. by a centre plate (not shown). In an embodiment of the invention, a quench inlet (not shown) may be placed in the collecting section for adding cooling quench fluid to the fluid stream.

The mixing section 03 is formed in the same horizontal level and in extent of the collecting section. Hence, the fluid flows directly from the collecting section and further into the mixing section in the same circular channel 06. Mixing of the gas and maybe liquid and vapour takes place in the mixing channel as it travels in a circular arc in almost the maximum diameter of the mixing device before entering the discharging section 04 through slot openings in the wall. The mixing in the mixing section is enhanced by means of guide vanes 09 and guide ramps 10 as shown. These vanes are especially efficient to lift and guide a relatively heavy liquid fraction of the fluid against the forces of gravity and the centrifugal forces which otherwise counter a homogenous mixing. In the discharging section the mixed gas and possibly liquid and vapour leaves the mixer in a uniform flow. A spilling brim 08 withholds an even level of liquid in the discharging section and through the vapour lift principles; the gas is lifting droplets of the liquid and carry it out of the collecting section towards the open space centre part (which is also the centre of the circular cross-section of the reactor 05) of the mixing device and further towards the catalyst bed below (not shown). The discharging section may also be constructed to allow for discharge of fluid towards the outer diameter of the mixing device (not shown). To further even out the distribution of the fluid to the catalyst bed below, distribution trays as known in the art (not shown) may be installed below the mixing device, above the downstream catalyst bed.

Figure 2:
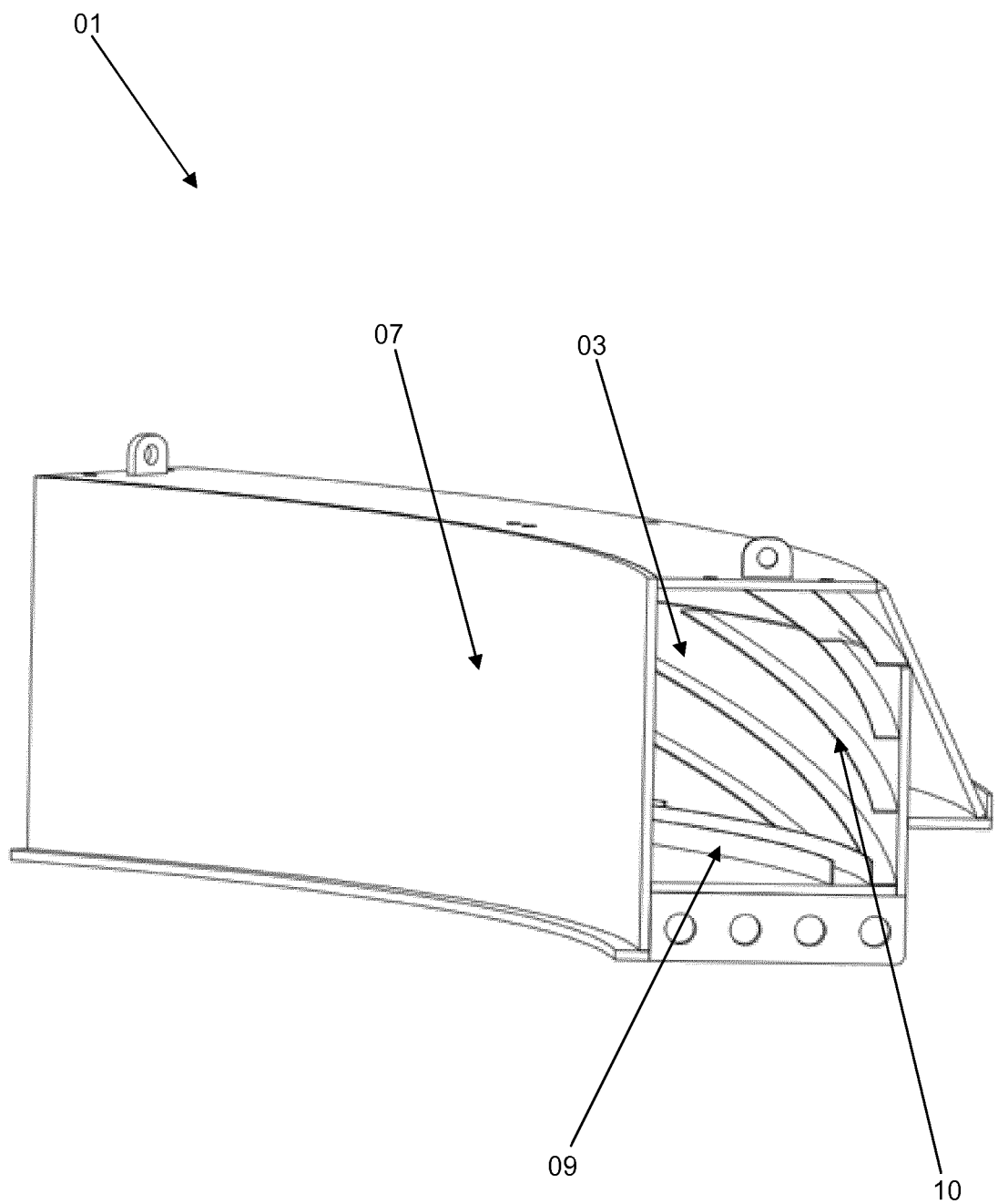
FIG. 2 shows a diametric cut view of a part of the mixing device in a multi-bed catalytic reactor (not shown) according to an embodiment of the invention.
Figure 3:
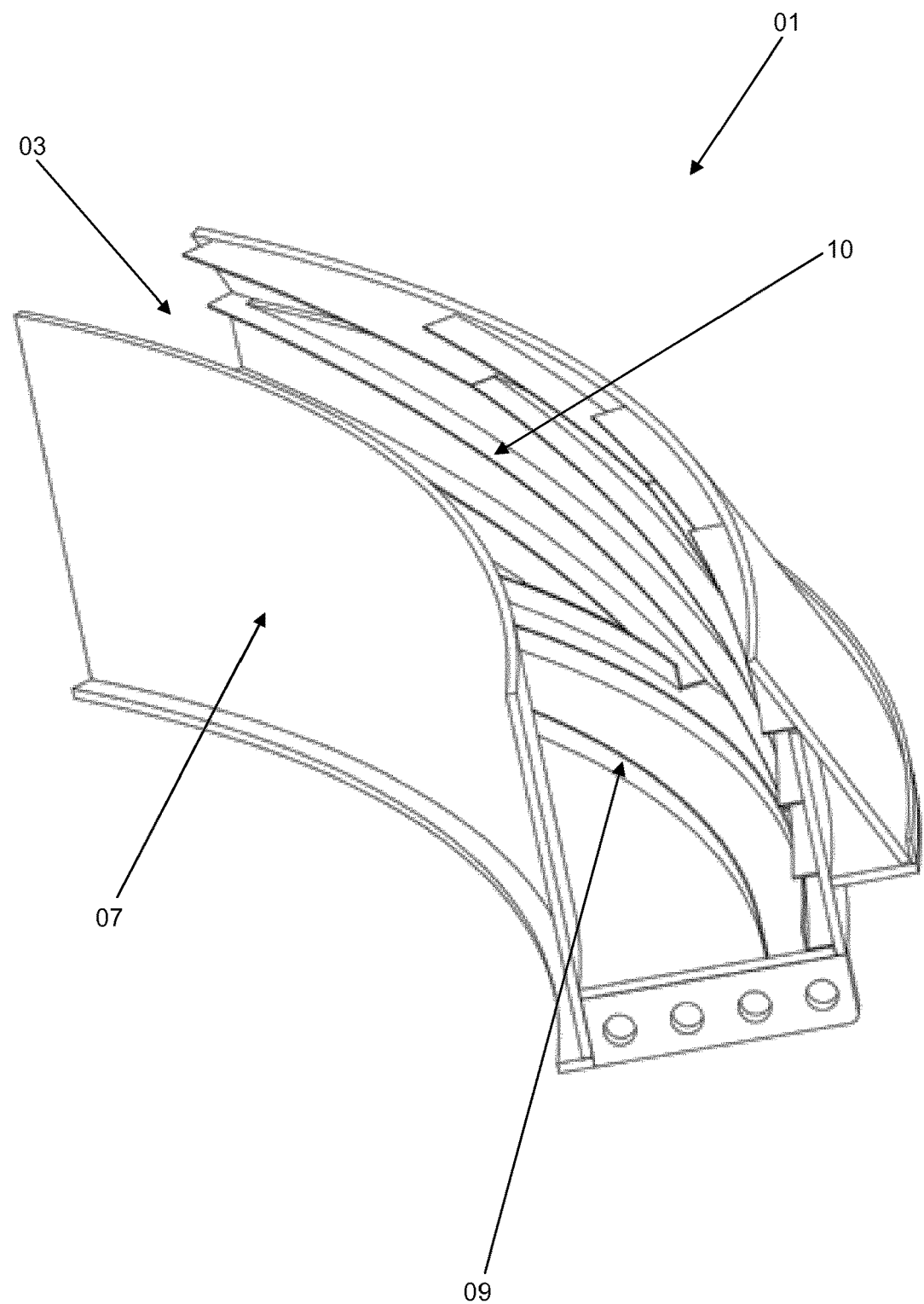
FIG. 3 shows a diametric, top-open isometric cut view of the mixing device in a multi-bed catalytic reactor (not shown) according to an embodiment of the invention.

In FIG. 2 and FIG. 3, the guide vanes and guide ramps can be seen in more detail. As seen, they are made in relative thin plate material. The thickness of the plate is made as thin as possible in consideration of the necessary structural strength. The slightly curved shape of the vanes provides additional structural strength. The guide vanes have an inwards progression as the first end of the guide vanes are arranged adjacent to the outer wall of the mixing section, whereas the second end of the guide vanes are located further inwards. This inwards progression of the guide vanes counters the tendency for especially the relative heavy liquid fraction of the process fluid to seek towards the periphery of the circular mixing device. Likewise, the guide ramps have an upwards progression as the first end of the guide ramps are arranged adjacent to the floor of the mixing device, whereas the second end of the guide ramps are arranged further upwards towards the ceiling of the mixing device, giving especially the relative heavy liquid fraction of the fluid an upwards motion, countering the forces of gravity to enhance a homogenous mixing for the fluid. As can be seen, the ramps and vanes at all times block only small fractions of the mixing channel cross section, giving only minor effect on the pressure loss in the channel.

EXAMPLE

In a mixing device for a multiple-bed catalytic reactor, spirals (guide vanes and guide ramps) are arranged along the inside of the outer wall and floor of the mixing section of the mixing device. 24 guide ramps along the outer wall and 12 guide vanes along the floor, all 25 mm of height are arranged in the mixing device.

The observations are:
At the entrance to the mixing section channel, dispersion of the liquid phase of the fluid is observed due to a "messy" inlet flow.
Further within the mixing section, the liquid soon starts to distribute both near the ceiling and near the floor of the mixing section.
Towards the end of the mixing section, approximately 220° around the circle of the mixing section, again a good fraction of the liquid phase is distributed along the full cross sectional area of the mixing section, indicating good dispersion.
Result: The fraction of liquid being trapped at 90-100% concentration has been reduced from 35.8% in a mixer without guide vanes and guide ramps down to 6.8% in the present case with 24 guide ramps and 12 guide vanes.

The invention claimed is:

1. A multi-bed catalytic reactor with a cylindrical shape comprising a mixing device mounted between two catalyst beds in said reactor, said mixing device has a circular outer rim adapted to fit within the inner wall of the reactor, the mixing device comprises:
collecting means disposed in a collecting section for collecting fluid from an up-stream catalytic bed,
mixing means disposed in a mixing section comprising a floor, a ceiling and inner and outer walls for mixing the collected fluid, and
discharging means disposed in a discharging section for discharging the mixed fluid to a down-stream catalytic bed;
wherein the mixing device has a donut shape with a central open space, and the collecting section, the mixing section and the discharging section are disposed in the radial outer third of the circular cross-sectional area of the reactor, and the central open space occupies the radial inner two-thirds of the circular cross-sectional area of the reactor, and
wherein said mixing means comprise guide vanes with a first and a second end, guide ramps with a first and a second end, or comprises said guide vanes and said guide ramps.

2. A multi-bed catalytic reactor with a cylindrical shape comprising a mixing device according to claim 1, wherein the floor of said mixing section comprises guide vanes.

3. A multi-bed catalytic reactor with a cylindrical shape comprising a mixing device according to claim 1, wherein the outer wall of said mixing section comprises guide ramps.

4. A multi-bed catalytic reactor with a cylindrical shape comprising a mixing device according to claim 1, wherein the ceiling of said mixing section comprises guide vanes.

5. A multi-bed catalytic reactor with a cylindrical shape comprising a mixing device according to claim 1, wherein said guide vanes have an inwards progression when seen in the flow direction from the collecting section to the discharging section and the inwards progression relative to the length of the guide vanes is less than 1 to 2.

6. A multi-bed catalytic reactor with a cylindrical shape comprising a mixing device according to claim 1, wherein said guide ramps have an upwards progression when seen in the flow direction from the collecting section to the discharging section and the upwards progression relative to the length of the guide vanes is less than 1 to 2.

7. A multi-bed catalytic reactor with a cylindrical shape comprising a mixing device according to claim 1, wherein said guide vanes have a height which is less than one third of the cross sectional width of said mixing section.

8. A multi-bed catalytic reactor with a cylindrical shape comprising a mixing device according to claim 1, wherein said guide ramps have a height which is less than one third of the cross sectional height of said mixing section.

9. A multi-bed catalytic reactor with a cylindrical shape comprising a mixing device according to claim 1, wherein the guide vanes and guide ramps are made from plate with a thickness between 0.25 and 4 mm.

10. A multi-bed catalytic reactor with a cylindrical shape comprising a mixing device according to claim 1, wherein the first end of each guide vane is arranged adjacent to the outer wall of said mixing section and the second end of each guide vane is arranged adjacent to the inner wall of said mixing section.

11. A multi-bed catalytic reactor with a cylindrical shape comprising a mixing device according to claim 1, wherein the first end of each guide ramp is arranged adjacent to the floor of said mixing section and the second end of each guide ramp is arranged adjacent to the ceiling of said mixing section.

12. A multi-bed catalytic reactor with a cylindrical shape comprising a mixing device according to claim 1, wherein the number of guide vanes is between 2 and 200.

13. A multi-bed catalytic reactor with a cylindrical shape comprising a mixing device according to claim 1, wherein the number of guide ramps is between 2 and 200.

14. A multi-bed catalytic reactor with a cylindrical shape comprising a mixing device according to claim 1, wherein the outer rim of said mixing device is an integrated part of the reactor wall.

15. A multi-bed catalytic reactor with a cylindrical shape comprising a mixing device according to claim 1, wherein the collecting means, the mixing means and the discharging means comprise channels comprising circular arc divider walls horizontally dividing one section from another section or dividing one section from the centre of the circular cross-section of the reactor.

16. A multi-bed catalytic reactor with a cylindrical shape comprising a mixing device according to claim 1, wherein the mixing device further comprises a quench inlet for adding a quench fluid to the collected fluid, said quench inlet is disposed in the collecting section.

17. A multi-bed catalytic reactor with a cylindrical shape comprising a mixing device according to claim 1, wherein the collecting section is disposed in an upstream axial level of the reactor relative to the discharging section.

18. A multi-bed catalytic reactor with a cylindrical shape comprising a mixing device according to claim 1, wherein the collecting section is disposed in an outer generally circular cross sectional area of the reactor relative to the mixing section, and the mixing section is disposed in an outer generally circular cross sectional area of the reactor relative to the discharging section.

19. A multi-bed catalytic reactor with a cylindrical shape comprising a mixing device according to claim 1, wherein the collecting section, the mixing section and the discharging section each is disposed in at least a 120° sector of the generally circular cross sectional area of the reactor.

20. A multi-bed catalytic reactor with a cylindrical shape comprising a mixing device according to claim 1, wherein the discharging means comprise an inner circular arc divider walls providing a spilling brim for a liquid phase of the fluid.

21. A multi-bed catalytic reactor with a cylindrical shape comprising a mixing device according to claim 1, wherein the mixing device forms an integrated part of a catalyst bed support of the reactor.

22. A multi-bed catalytic reactor with a cylindrical shape comprising a mixing device according to claim 1, wherein the mixing device has a height of less than 1 m, preferably less than 0.5 m with respect to the axial direction of the reactor.

* * * * *